Oct. 25, 1938.  A. G. THOMAS  2,134,061
FILTER
Filed Nov. 20, 1936
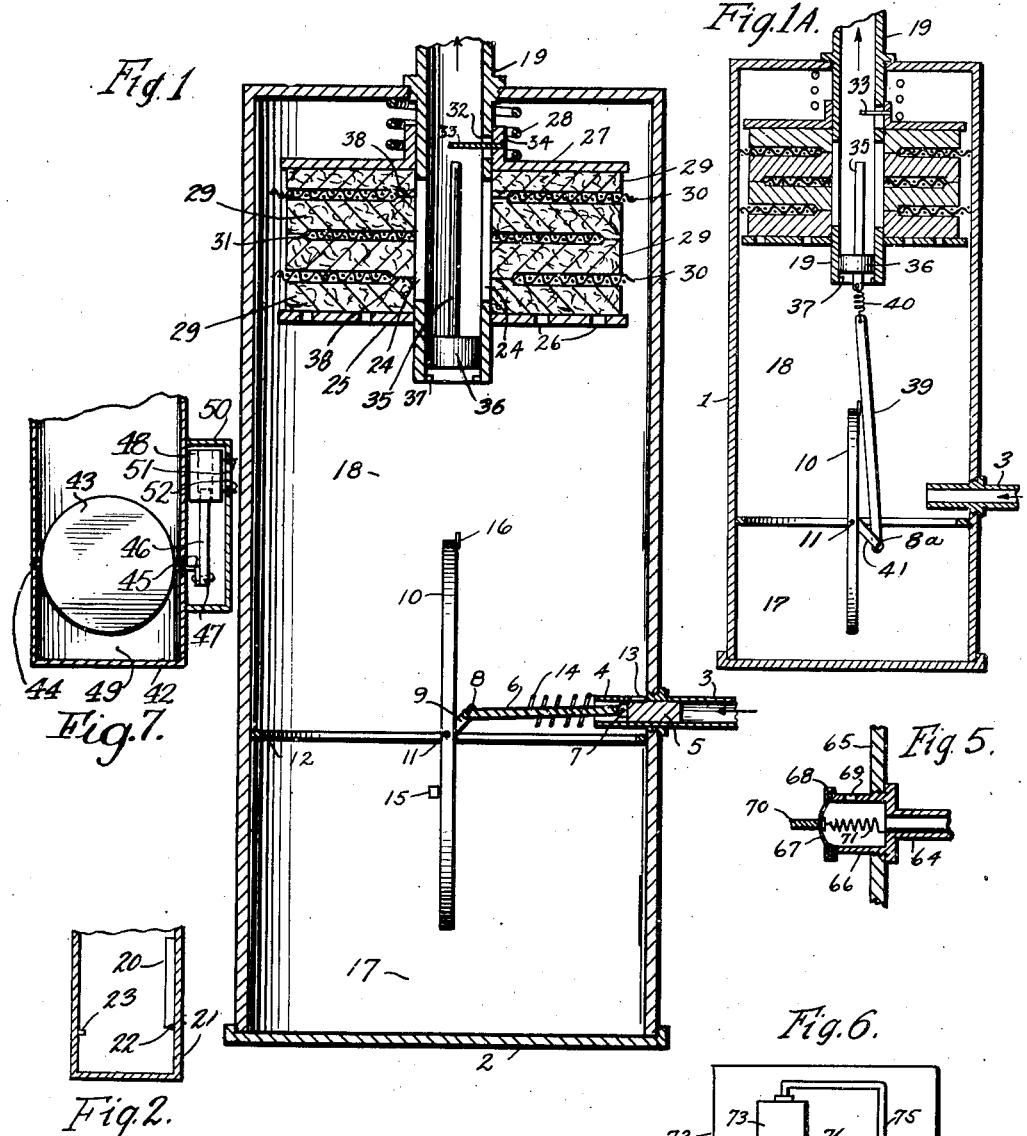
Albert G. Thomas
Inventor Patented Oct. 25, 1938

2,134,061

UNITED STATES PATENT OFFICE 2,134,061

FILTER

Albert G. Thomas, Lynchburg, Va.

Application November 20, 1936, Serial No. 111,755

7 Claims. (Cl. 210—179)

This invention relates to filters, and especially to filters such as those used in connection with internal combustion engines for cleaning the oil supply. This is a continuation-in-part of my applications Serial No. 61,483 filed January 30, 1936, and Serial No. 70,734 filed March 25, 1936.

An object is to provide a filter through which all the circulating oil may be passed, without danger of clogging.

Another object is to provide a filter in which the separation of solid material from the oil is accomplished largely by gravity, means being provided so that the matter settled out will be permanently removed from the circulating oil. This type of filter is exceptionally efficient as evidenced by the fact that the oil in the crankcase of an automobile engine will become clear after the engine is stopped for a while.

Other objects will appear in the specification.

In the drawing:

Figure 1 is a part-sectional elevation of a filter with compressed filtering elements and a sediment chamber with oil pressure-operated cover.

Figure 1A, is a part-sectional elevation of a variation of the construction shown in Figure 1.

Figure 2 is a fragmentary part-sectional elevation of a filter casing with sediment chamber cover hinged to one wall of the casing.

Figure 3 is a part-sectional elevation of an engine crankcase pan with pressure operated sediment chamber cover.

Figure 4 is a fragmentary plan view of the pan shown in Figure 3.

Figure 5 is a fragmentary sectional elevation of a diaphragm element for closing a sediment chamber cover.

Figure 6 is a side elevation of the filter of Figure 1, connected to an engine.

Figure 7 is a fragmentary part-sectional elevation of a filter casing with a sediment chamber cover operated by magnetic means.

In Figure 1 casing 1 has threaded bottom cover plate 2 screwed on. Inlet pipe 3 is threaded into a flattened portion of casing 1 and is extended to form cylinder 4 in which piston 5 is slidable. Link arm 6 is pivoted to piston 5 at 7 and is pivoted at 8 to inclined arm 9 fastened to plate 10 which is fastened to shaft 11 the ends of which have bearing in suitable recesses in ring 12 fastened to casing 1 as shown. One end of tension spring 14 is fastened to link 6 and the other end to cylinder 4 in which hole 13 is provided.

Spring 14 will normally pull link 6 so that plate 10 will be held in a vertical plane against stop 15 fastened to casing 1, but when oil under pressure is supplied to pipe 3 piston 5 will be forced to the left so that plate 10 will be rotated to lie in a horizontal position flush with ring 12. Lug 16 fastened to plate 10 will strike against ring 12 to limit the movement of the plate. This lug may be extended to form a flange around the semi-periphery of plate 10 and a similar flange may be provided on the opposite lower side. In any event plate 10 will form a close fit and will tightly close off sediment chamber 17 from upper chamber 18 of the filter, when the incoming oil pushes piston 5 to the left and so enters chamber 18 through hole 13. As long as the incoming oil passes through pipe 3, plate 10 will be held in horizontal closed position.

Therefore, if the filter is connected in the oil circulating system of an engine, each time the engine is started sediment chamber 17 will be automatically closed off from chamber 18 from which oil will flow to outlet pipe 19 which is threaded into casing 1.

Each time the engine is stopped the pressure of oil against piston 5 ceases and so tension spring 14 will pull link arm 6 back so that plate 10 is pulled to the vertical position as shown in Figure 1. Solid matter then begins to settle out of the oil in chamber 18 by gravity and this matter falls into sediment chamber 17 in which it remains since cover plate 10 automatically blocks off chamber 17 when the engine is started, so that the sediment in chamber 17 will not be stirred up into the oil stream.

The chamber 18 may be made relatively large in comparison with the total volume of oil so that a large part, or a major portion of the oil supply will be filtered when the engine is at rest. Each time the engine is stopped a fresh volume of oil in chamber 18 is filtered and so the total oil supply will be rapidly filtered if chamber 18 is sufficiently large and if fairly frequent stops are made. The time required for particles to settle out of the oil in chamber 18 will depend upon the temperature and viscosity of the oil, the size and nature of the particles, and the length of stop. Ordinarily these factors will be such that more solid matter will be taken out of the oil by this filter than with filters using fabrics or similar elements.

Cover plate 10 should be pivoted at such a height that its lower edge will not stir up sediment when it is rotated. This cover may be hinged at one edge to prevent this, as shown by sediment chamber cover plate 20 of Figure 2. This plate is hinged at 22 to casing 21 and in the closed position rests against lug 23. It may be moved by piston mechanism (not shown) similar to that illustrated in Figure 1.

Drain pipe 19 has longitudinal slots 24. Perforated plate 25 with holes 26 is fastened to pipe 19. Axially slidable plate 27, which may also be perforated, fits closely around pipe 19. Compression spring 28, pressing against the top of casing 1 and against plate 27, urges this plate toward plate 25 to compress filtering discs 29 made of felt or some suitable material. These discs have central holes so that they will fit snugly over pipe 19. Washers 30 made of screening or the like separate discs 29 and conduct oil from chamber 18 between them but not directly to slots 24. Washer 31 also made of screening or the like is of lesser diameter than washers 30 and serves to conduct oil filtering through the discs 29 to slots 24 so that the filtered oil will pass into drain pipe 19 and so to parts of the engine or to the crankcase. The construction is similar to that shown in my application Serial No. 70,734, filed March 25, 1936.

Pin 33 is fastened to hub 34 of plate 27 and is movable in slot 32 in pipe 19. Rod 35 is fastened to piston 36 which is slidable in pipe 19, end stop lug 37 being provided.

Normally, oil passes radially down the channels formed by washers 30 and through filtering discs 29 and then down washer channel 31 and so through slots 24. Some of the oil, especially in the case of the end discs 29, passes radially through those discs or through the narrow annular gaps 38 between discs 29. While the oil is being filtered, a certain back pressure will exist in chamber 18 so that piston 36 will be forced upward until rod 35 strikes pin 33. The pressure on pin 33 will therefore tend to move plate 27 upward against compression spring 28 so that the greater the pressure on the bottom face of piston 36, the less will spring 28 compress filtering discs 29. Therefore as the pores of these discs become more clogged with solid matter filtered out of the oil the pressure of plate 27 compressing the filtering elements will become less so that the pores will automatically tend to enlarge due to the resiliency of the filtering material. Should the pores finally become clogged, the pressure against piston 36 will become sufficient to reduce the compression of spring 28 enough for oil to pass through annular spaces 38 and so into pipe 19. Any leakage of oil that may pass around piston 36 will flow out of pipe 19. It is obvious that any number of filtering discs 29 and washers 30 and 31 may be used. These filtering discs may be of different thicknesses so that some of them will trap fine particles and some of them coarser particles alone. The general principle of these filtering pads is the same as that shown in Figure 1 of my previously mentioned application Serial No. 70,734, filed March 25, 1936. The principal difference is that a piston is used in this case instead of a diaphragm. The piston 36 normally rests against lug 37 by gravity, when no oil pressure exists in chamber 18.

As shown in Figure 1A, piston 5 and connected mechanism may be eliminated if desired. In that event tension spring 40 will be fastened to piston 36 and to link arm 39 which is pivoted to arm 41 by means of pivot 8a. Arm 41 is attached to cover plate 10 at an angle of approximately 45 degrees as shown. Then if chamber 18 is filled with liquid by means of inlet pipe 3, piston 36 will be forced up in tube 19 and will pull spring 40, and arm 39 in an upward direction to rotate arm 41 and consequently cover plate 10 in counter-clockwise direction to close off sediment chamber 17. Spring 40 will allow piston 36 to continue to travel so that rod 35 may strike pin 33, even though plate 10 is tightly closed. When the liquid pressure ceases to hold piston 36 up it will fall by its own weight, together with the weight of arm 39 and arm 41 so that cover plate 10 will be rotated to the open or vertical position as shown. Arm 39 may be used as a stop for plate 10 or any other suitable stop may be provided.

In this form of the device the piston 36 serves two purposes. Chamber 18 should be kept filled with liquid by bending inlet pipe 3 up to the level of the top of casing 1, or by using a suitable check valve in pipe 3. This is to prevent the settling liquid from draining out when the pressure ceases and is also for the purpose of causing immediate movement of piston 36 when additional liquid is forced into chamber 18 through pipe 3, in order to prevent stirring of the sediment in chamber 17 by the incoming liquid stream.

Any kind of filtering unit may be used in the top of the chamber 18, or none at all. The additional filtering effect is preferable however. Drain pipe 19 may be extended as far toward ring 12 as desired, so that oil may be pumped from pipe 19 even if chamber 18 is not full. Pipe 19 may be off-set so that it will not be struck by plate 10. When sufficient sediment accumulates in chamber 17 it may be removed by unscrewing bottom cap 2 which may be in the form of a cup and which may have baffles to help trap the sediment. It is obvious that the vacuum of the intake of the engine may be used to move the cover plate, or any moving part of the engine or car may be employed for that purpose. The vacuum may be applied to pipe 3 of Figure 1 to draw piston 5 to the right. In this case link arm 6 would be connected with arm 41, and a separate inlet would be provided.

In Figure 3 is shown crankcase pan 53 with false bottom 54 forming sediment chamber 61. Bottom 54 has slots 60 with which slots 59 of slidable cover plate 55 may be registered. An extension 62 of plate 55 is fastened to piston 57 working in cylinder 56 fastened to pan 53. Inlet pipe 58 is connected to the oil circulating system so that pressure will force piston 57 and plate 55 to the left to cover slots 60 when the engine is started. When the engine is stopped spring 63 retracts piston 57 so that slots 59 and 60 are brought into register. Solid matter will then fall through these slots into chamber 61.

In Figure 5 is shown a method of tripping the cover plate by means of a diaphragm instead of a piston. Inlet pipe 64 is threaded into casing 65 with diaphragm 67 clamped to cylinder 66 integral with pipe 64, by means of threaded ring 68. Hole 69 is provided in cylinder 66 so that oil will flow into the interior of casing 65. Rod 70 is fastened to the center of diaphragm 67 so that this rod will be displaced as oil pressure forces the diaphragm to the left. The rod 70 can then be linked to a cover plate, similarly to arm 6 of Figure 1. Spring 71 will normally pull diaphragm 67 to the right.

In Figure 6 is shown engine 72 with filter 73 attached. Oil is supplied to the filter through pipe 76 and is withdrawn from the filter by pipe 75.

In Figure 7 sediment chamber cover plate 43 is fastened to shaft 44 having rotational bearing in casing 42. Shaft 44 passes through casing 42 and is bent to form arm 45 to which solenoid armature 46 is pivoted at 47. Solenoid coil 48 may be supplied with current from the ignition circuit each time the ignition key is turned to make contact. Therefore armature rod 46 will be pulled up by magnetic action so that plate 43 will be turned to lie in a horizontal plane and block off sediment chamber 49 each time the engine is started. When the engine is stopped and current is not supplied to coil 48, rod 46 drops and turns plate 43 back into a vertical plane as shown so that solid material may settle into chamber 49. The wires 51 and 52 supplying current to coil 48 are brought through cover 50 fastened to casing 42.

The method of settling solid material out of a liquid by gravity and then sealing the sediment off permanently is novel and highly efficient. It will filter both large and small particles if sufficient time is allowed and is far superior to older methods employing filtering material alone, since, in such filters the oil continually passes through the objectionable foreign matter trapped out of the oil and may take some of it up again. Furthermore my filter will remove particles of smaller size than other filters as described.

This filter may also be used for other liquids in addition to its use for oil.

What I claim is:

1. In a filter, a casing, an inlet and an outlet for liquid in said casing, filtering means disposed within said casing, yielding means compressing said filtering means, a piston acting upon said yielding means and operated by pressure of said liquid to reduce the compression of said filtering means in inverse relation to the pressure of said liquid, a sediment compartment within said casing, a cover for said compartment, and means for connecting said piston with said cover so that said compartment will be closed when said liquid is flowing through said filter.

2. In a filter, a casing, an inlet and an outlet for liquid in said casing, filtering discs separated by liquid conducting elements and surrounding a drain tube, yielding means compressing said filtering discs, and a piston movable in a cylinder, said piston coacting with said yielding means, and said piston acting upon said yielding means to reduce the compression of said filtering discs as the pressure of said liquid is increased.

3. In a filter, a casing, an inlet and an outlet for liquid in said casing, filtering means disposed within said casing and surrounding a drain tube within said casing, a piston movable in said drain tube, an opening in said tube to allow said liquid to be forced against said piston by liquid pressure, yielding means compressing said filtering means, means connecting said piston with said yielding means, said connecting means acting upon said yielding means to reduce the degree of compression of said filtering means as the pressure of said liquid is increased.

4. In a filter, a casing, an inlet and an outlet for liquid in said casing, a sediment chamber within said casing, means operated by pressure of said liquid to close off said sediment chamber from the remainder of the space within said casing and to keep said chamber closed at all times while said liquid is flowing, and yielding means for opening said sediment chamber when said pressure is reduced below a predetermined amount.

5. In a filter, a casing, an inlet and an outlet for liquid in said casing, a sediment compartment within said casing, a movable closure within said casing for said compartment, a piston movable in a cylinder and associated with said closure, means for admitting said liquid to said cylinder so that said piston will move said closure to close said compartment while said liquid is flowing through said casing, and yielding means associated with said closure for opening said compartment while said liquid is not flowing through said casing.

6. In a filter, a casing, an inlet and an outlet for liquid in said casing, a sediment chamber within said casing, an engine associated with said filter, means for supplying said liquid from said engine to said filter, means for returning said liquid from said filter to said engine, automatically actuated means for by-passing said liquid around said sediment chamber while said engine is running, and for connecting said liquid in said casing with said sediment chamber while said engine is not running.

7. In a filter, a casing, an inlet and an outlet for liquid in said casing, a sediment chamber within said casing, an engine associated with said filter, means for supplying said liquid from said engine to said filter, means for returning said liquid from said filter to said engine, electrically actuated means for by-passing said liquid around said sediment chamber while said engine is running and for connecting said liquid in said casing with said sediment chamber while said engine is not running, said last named means being connected to the ignition system of said engine for operation thereby.

ALBERT G. THOMAS.